Sept. 20, 1960  C. C. NIXON  2,952,864
WINDSHIELD WASHER FOR AUTOMOBILES
Filed March 28, 1957
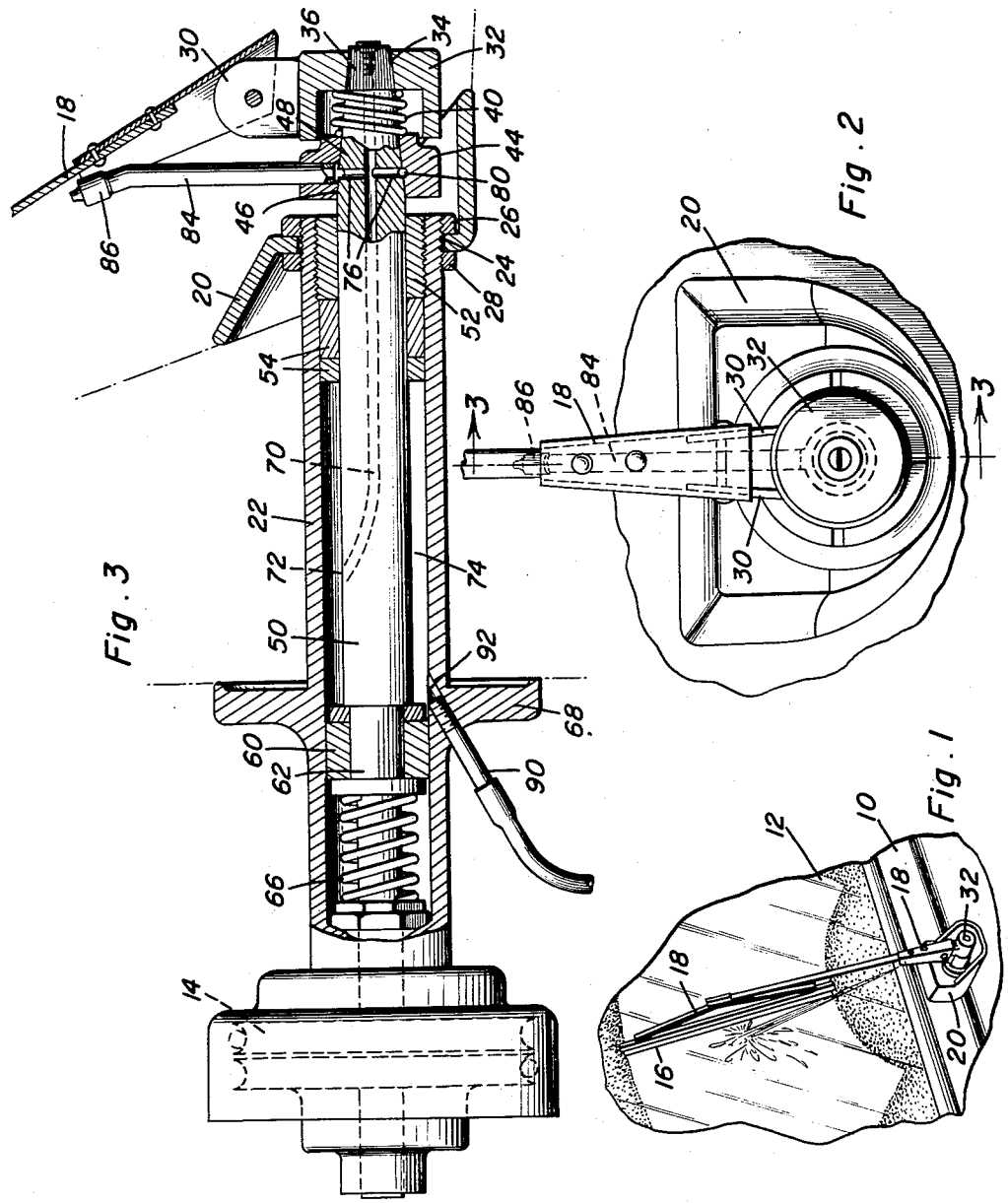
Carl C. Nixon
  INVENTOR.

United States Patent Office 2,952,864
Patented Sept. 20, 1960

2,952,864
WINDSHIELD WASHER FOR AUTOMOBILES
Carl C. Nixon, 2300 Shimmons Road, Pontiac, Mich.
Filed Mar. 28, 1957, Ser. No. 649,057
4 Claims. (Cl. 15—250.04)

This invention relates to windshield washers for motor vehicles and more particularly, to windshield wiper washers that are operatively connected with the mechanism by which the windshield wiper blade receives its motive force.

An object of the present invention is to provide a practical device for a motor vehicle which supplies liquid under pressure on the windshield in order to be swabbed therefrom by means of the windshield wiper blade.

More particularly, it is an object of the invention to provide an attachment as described above wherein the means to apply the liquid under pressure onto the windshield wiper oscillates with the windshield wiper blade in order to apply the liquid where it is most needed, that is, in the proper spaced relationship to the blade as it is in its normal operational oscillatory movement.

These together with other objects and advantages which will become subsequently apparent reside in the details of construction and operation as more fully hereinafter described and claimed, reference being had to the accompanying drawings forming a part hereof, wherein like nuumerals refer to like parts throughout, and in which:

Figure 1 is a fragmentary perspective view of the windshield wiper and windshield on which the wiper is operative;

Figure 2 is a front elevational view of the attachment which is constructed in accordance with the invention; and Figure 3 is a longitudinal sectional view taken on the line 3—3 of Figure 2.

In the accompanying drawings there is shown a portion of a motor vehicle including the cowl 10 and the windshield 12. Ordinarily windshield wipers are mounted for oscillation on the cowl of the motor vehicle, although there may be some deviation from this.

Figure 3 illustrates by dotted lines, double pulleys 14 for oscillating the windshield wiper blade 16 that is carried by the windshield wiper arm 18. Face plate 20 is mounted on the cowl 10 and has sleeve 22 passed through an opening 24 therein and held in place by suitable means, as nuts 26 and 28 carried on the end of sleeve 22 and bearing against opposite surfaces of the face plate 20.

The windshield wiper arm 18 is mounted for pivotal movement on ears 30 provided on a cap 32, the latter having a tapered hole 34 in which a tapered serrated stud 36 is fitted. The arm 18 is spring loaded in the direction of the windshield 12 by suitable means thereby keeping the windshield wiper blade 16 pressed with correct force against the windshield in order to perform the cleaning operation. Spring 40 is in cap 32, reacting on the cap and on the collar 44 that has a tapered bore 46 fitted over the tapered part of spindle 50, on the outer end of which cap 32 is fitted. Hollow nut 52 and bushings 54 are fitted in the end of sleeve 22 and have spindle 50 passed therethrough. Packings and/or bushings 60 are in the inner end of the sleeve 22 fitted over reduced part 62 of spindle 50 and reacting on compression spring 66 in sleeve 22. This structure is behind the mounting flange 68 that is on sleeve 22 and which is adapted to bear against a part of the motor vehicle in mounting the windshield wiper apparatus operatively on the motor vehicle.

There is a longitudinal passageway 70 extending from the outer end of spindle 50 to an intermediate part thereof where it opens through a port 72 into the chamber 74 enclosed by the inner surface of sleeve 22 and the bushings 54 and 60. Tranverse passages 76 in the tapered part 48 of the spindle open into an annular passage 80 formed in the spindle and in registry with the open end of pipe 84 that is fitted in a socket formed in collar 44. There is a nozzle 86 on the end of pipe 82 to direct the stream of liquid from the pipe 84 adjacent to, beneath or in the precise place on the windshield 12 where the windshield wiper blade 16 is located.

Liquid under pressure is applied to the chamber 74 through pipe 90 which is in communication with a passage 92 formed in the sleeve 22. Any suitable means of supplying liquid under pressure may be attached with the piping 90.

In use the windshield wiper is actuated in the ordinary manner. There is no interference with this operation by the liquid spraying feature. However, when it is desired to apply liquid onto the windshield, this is done by merely opening a suitable valve causing the liquid to flow through piping 90, chamber 74, passageway 70 and finally, pipe 84 and nozzle 86. But, the water is not sprayed at one particular location. It is sprayed over the entire area covered by the windshield wiper blade 16. As will be obvious from the drawing, the collar 44 in assembling operations may be positioned on the tapered part of the spindle 50 in different angular positions thereon with the nozzle pipe 82 similarly positioned and communicating with the annular passage 80, so that said nozzle pipe 82 will be supplied with liquid from the passageway 70 in any such angular position of said collar 44 and nozzle pipe 82.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a motor windshield wiper assembly for a vehicle, a sleeve attachable rigidly to a vehicle, an oscillatable spindle extending through said sleeve and having one end projectitng out of the sleeve, a windshield wiper arm fixed on the projecting end of the spindle for oscillation by the spindle, a spray pipe intermediate said sleeve and arm, means on said projecting end mounting the spray pipe on said end for oscillation by said spindle, a pair of spaced apart bearings in said sleeve for said spindle partitioning said sleeve intermediate its ends and forming with said sleeve a chamber in the sleeve intermediate the ends of the sleeve for supplying to the spray pipe liquid introduced under pressure into said chamber, and means communicating the chamber with said spray pipe including a longitudinal bore in said spindle opening at one end at one side of the spindle intermediate the ends of the spindle into said chamber, an annular circumferential groove in said projecting end of the spindle forming a passageway communicating with said spray pipe, and radial ports in said spindle communicating said bore with said groove, said means mounting said spray pipe comprising a collar on said end of the spindle adapted for assembly with said spindle in different angular positions on said end and having one end of the spray pipe fixed therein in communication with said groove for supply of liquid from said bore to said spray nozzle through said groove in the different angular positions of said collar.

2. In a combined windshield wiper and washer, the combination of a mounting sleeve, an oscillatory spindle positioned in and projecting at one end thereof from said sleeve, the projecting end portion of said spindle being tapered, a cap secured to the projecting end of the spindle for oscillation therewith, a wiper blade carrying arm attached to said cap and extending in a plane radial to the spindle, a collar having a tapered bore complemental to and receiving the tapered end portion of said spindle, a washing fluid spray pipe carried by said collar and extending in a plane radial to the spindle, said collar being rotatably positioned on the tapered portion of the spindle whereby the radial plane of said spray pipe may be angularly adjusted about the axis of said spindle relative to the radial plane of said blade carrying arm, means for frictionally retaining said collar in a pre-adjusted position on the spindle, and means for delivering washing fluid to said pipe.

3. The device as defined in claim 2 wherein said means for retaining said collar in a pre-adjusted position on said spindle comprise a compression spring positioned on the spindle between said collar and said cap.

4. The device as defined in claim 2 wherein said means for delivering washing fluid to said pipe are constituted by an annular groove formed in the tapered portion of said spindle and having said pipe in communication therewith, said spindle being provided with a longitudinal bore and with ports communicating said longitudinal bore with said groove, and means for delivering washing fluid to the bore in the spindle.

References Cited in the file of this patent

UNITED STATES PATENTS

| | | |
|---|---|---|
| 2,268,253 | Hill | Dec. 30, 1941 |
| 2,882,545 | Kelly et al. | Apr. 21, 1959 |

FOREIGN PATENTS

| | | |
|---|---|---|
| Ser.No.B 31,629 | Germany | April 5, 1956 |